United States Patent [19]
Chae

[11] Patent Number: 5,828,039
[45] Date of Patent: Oct. 27, 1998

[54] METHOD AND APPARATUS FOR HEATING CHEMICAL USED IN MICROELECTRONIC DEVICE FABRICATION

[75] Inventor: Hee-Sun Chae, Suwon, Rep. of Korea

[73] Assignee: Samsung Electronics Co., Ltd., Suwon, Rep. of Korea

[21] Appl. No.: 774,606
[22] Filed: Dec. 30, 1996

[30] Foreign Application Priority Data

Mar. 18, 1996 [KR] Rep. of Korea ............... 1996-7191

[51] Int. Cl.$^6$ ............................................. H05B 1/02
[52] U.S. Cl. .................... 219/486; 219/483; 219/509; 219/497; 392/488; 432/12
[58] Field of Search .................... 392/480, 481, 392/489, 488; 219/494, 497, 499, 501, 481, 486, 483, 569; 432/12

[56] References Cited

U.S. PATENT DOCUMENTS

| | | | |
|---|---|---|---|
| 4,380,431 | 4/1983 | Carlson, Jr. et al. | 432/29 |
| 4,459,468 | 7/1984 | Bailey | 219/490 |
| 4,959,526 | 9/1990 | Kurachi et al. | 219/314 |
| 5,214,740 | 5/1993 | Carroll | 392/481 |
| 5,288,471 | 2/1994 | Corner | 422/307 |
| 5,539,673 | 7/1996 | Charm et al. | 364/557 |

*Primary Examiner*—Mark H. Paschall
*Attorney, Agent, or Firm*—Jones & Volentine, L.L.P.

[57] ABSTRACT

A method and apparatus for heating a chemical used in microelectronic device fabrication processes. The apparatus includes a chemical supply and chemical bath for containing a chemical. A temperature sensor senses the temperature of the chemical contained in the chemical bath. A first heater, powered by a first electric power source, heats the chemical while it is being supplied to the chemical bath. A second heater, powered by a second electric power source, heats the chemical contained in the chemical bath. First and second power controllers regulate the first electric power and the second electric power sources, respectively, through a plurality of electrodes having different intensity levels that are selected according to the temperature of the chemical sensed by the temperature sensor.

8 Claims, 2 Drawing Sheets

METHOD AND APPARATUS FOR HEATING CHEMICAL USED IN MICROELECTRONIC DEVICE FABRICATION

BACKGROUND OF THE INVENTION

1. Field of the Invention

The present invention relates to a method and apparatus for heating a chemical used in microelectronic device fabrication, and more particularly, to a method and apparatus for heating a chemical used in microelectronic device fabrication, by which a chemical supplied to a chemical bath can be rapidly heated to a temperature suitable for immediate process application.

2. Description of the Related Art

In general, chemicals used mainly in wet processes for fabricating microelectronic devices, such as a semiconductor device, liquid crystal displays (LCD), and the like, must be heated to a temperature of about 45° C.–200° C., which is suitable for wet process applications.

Referring to FIG. 1, there is illustrated a schematic view showing the construction of a conventional apparatus for heating a chemical used in microelectronic device fabrication. The apparatus includes a chemical supplier 1 for supplying a chemical, a chemical bath 2 for containing the chemical supplied from the chemical supplier 1, and an IR lamp 3 disposed in the course of a pipe 1a. The pipe 1a connects the chemical supplier 1 and the chemical bath 2. The IR lamp 3 heats the chemical as it is supplied from the chemical supplier 1 to the chemical bath 2, according to a first applied electric power source.

The apparatus further includes a heater 4 and a temperature sensor 5. The heater 4 is located in the chemical bath 2 to further heat the chemical supplied to the chemical bath 2, according to a second applied electric power source. Also, the temperature sensor 5, located in the chemical bath 2, senses the temperature of the chemical contained in the chemical bath 2.

In the conventional apparatus constructed as mentioned above for heating a chemical for use in microelectronic device fabrication, when the chemical supplied from the chemical supplier 1 is filled in the chemical bath 2, the second electric power source is applied to the heater 4 so as to further heat the chemical to the predetermined processing temperature. Thereafter, the application of the second electric power source is ON-OFF controlled to ensure that the temperature of the chemical is maintained within an allowable range.

However, while the temperature of the chemical in the chemical bath 2 is being elevated to the predetermined processing temperature, the application of the second electric power source to the heater 4 is controlled only by the simple operation of ON-OFF switching. Accordingly, as shown in FIG. 2, it takes a relatively long time "t" for the temperature of the chemical to reach the predetermined processing temperature. Furthermore, even after the temperature of the chemical reaches the predetermined processing temperature, the temperature variation "1" around the predetermined processing temperature becomes large, thus decreasing productivity.

There exists a need, therefore, for an apparatus and method for heating a chemical used in microelectronic device fabrication, by which the chemical supplied to the chemical bath can be rapidly heated to a temperature suitable for immediate process application, and where the temperature of the chemical bath may be maintained within a suitable range thereafter.

SUMMARY OF THE INVENTION

Accordingly, the present invention is directed to a apparatus and method for rapidly heating a chemical to a suitable temperature for immediate process application, thereby reducing waiting time, and also maintaining the chemical at a temperature within a suitable range during processing, which substantially overcomes one or more of the problems due to limitations and disadvantages of the related art.

Additional features and advantages of the invention will be set forth in the description which follows, and in part will be apparent from the description, or may be learned by practice of the invention.

To achieve these and other advantages and in accordance with the purpose of the present invention, as embodied and broadly described, according to one aspect of the present invention, there is provided an apparatus for heating a chemical used in microelectronic device fabrication, the apparatus comprising: supplying means for supplying a chemical for a microelectronic device fabrication process; a chemical bath for containing the chemical supplied from the supplying means; sensing means for sensing a temperature of the chemical contained in the chemical bath; a first heater for heating the chemical as it is supplied from the supplying means to the chemical bath, the first heater being controlled by a first electric power source applied thereto; a second heater for heating the chemical contained in the chemical bath, the second heater being controlled by a second electric power source applied thereto; and a first and a second power control means for controlling the first electric power source and the second electric power source, respectively, according to the temperature of the chemical sensed by the sensing means.

According to another aspect of the present invention, each of the first and second heaters comprises a plurality of electrodes for selectively applying electric power of different intensity levels.

According to still another aspect of the present invention, there is provided a method for heating a chemical used in microelectronic device fabrication, said method comprising the steps of: (a) setting a predetermined processing temperature required for a microelectronic device fabrication process; (b) comparing the predetermined processing temperature with a temperature of a chemical contained in a chemical bath; (c) pre-heating the chemical supplied to the chemical bath when the temperature of the chemical is lower than the predetermined processing temperature, by applying a first electric power source to a first heater having multiple, selectable intensity levels; and (d) heating the chemical by applying a second electric power source to a second heater, having multiple, selectable intensity levels, to reduce a temperature change of the chemical in the chemical bath and to maintain the temperature of the chemical in the chemical bath within an allowable range.

By the features of the present invention, a chemical supplied to a chemical bath can be rapidly heated in a short time to a temperature suitable for immediate process application to reduce waiting time and thereby improve productivity. Also, the temperature of the chemical bath may be maintained within a smaller allowable range.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF THE PREFERRED EMBODIMENT

Hereinafter, a method and apparatus for heating a chemical used in microelectronic device fabrication in accordance with an embodiment of the present invention will be described in detail with reference to FIGS. 3 and 4.

Figure 1:
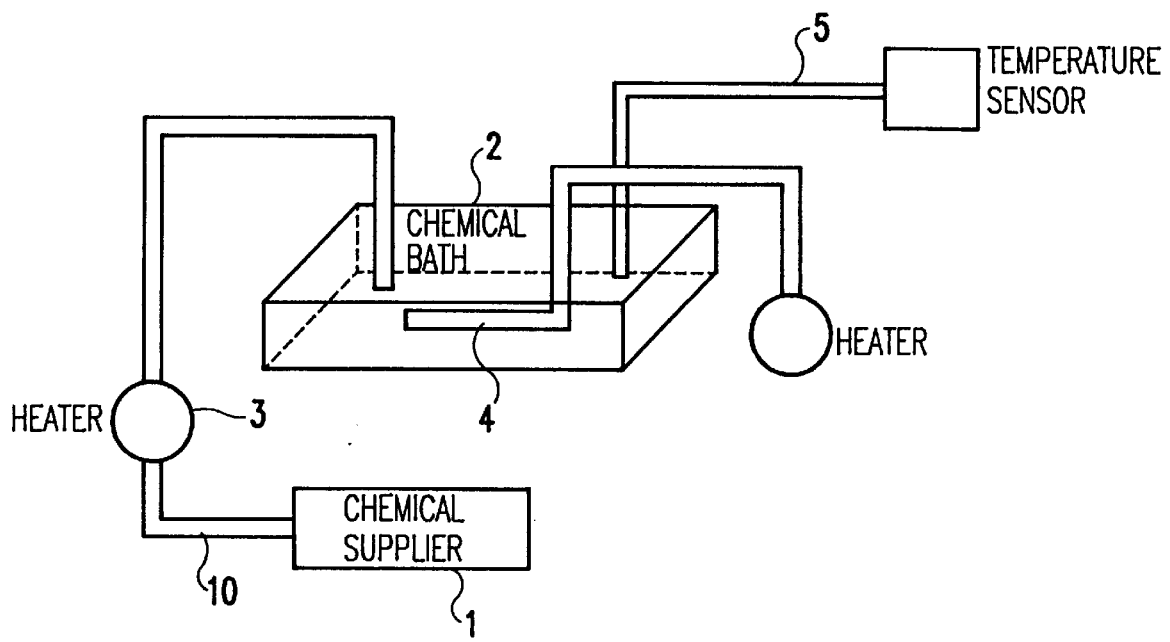
FIG. 1 is a schematic view illustrating the construction of a conventional apparatus for heating a chemical used in microelectronic device fabrication.
Figure 2:
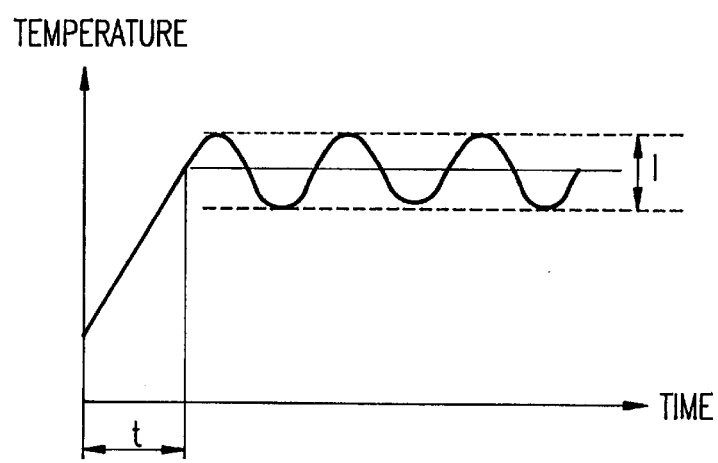
FIG. 2 is a graph showing the relation between time and temperature in heating a chemical by the conventional apparatus shown in FIG. 1.
Figure 3:
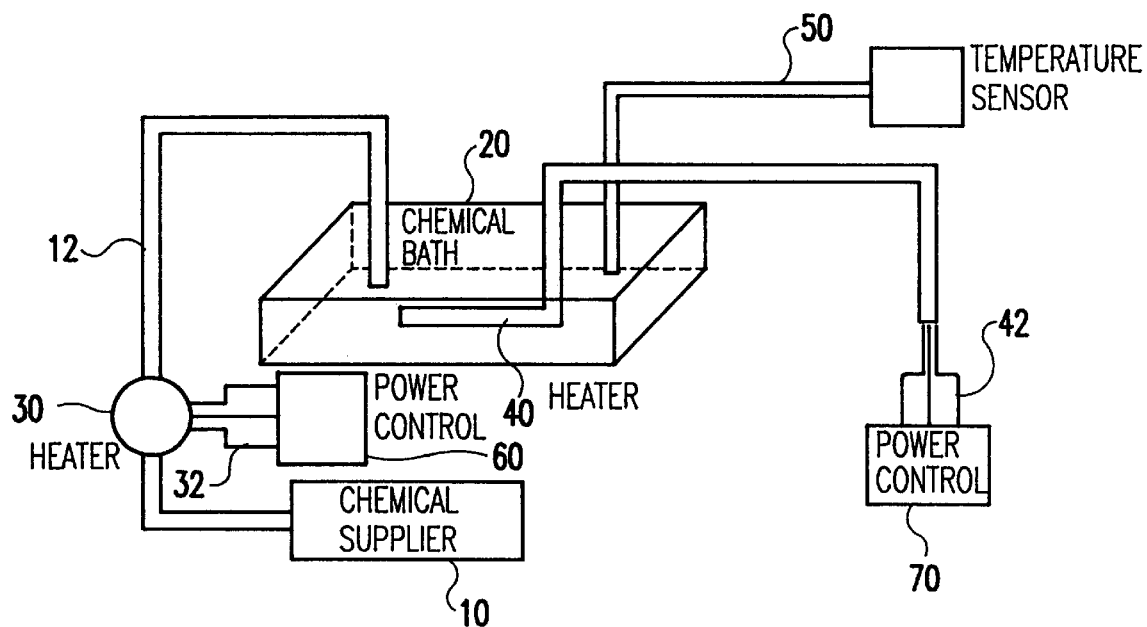
FIG. 3 is a schematic view illustrating the construction of an apparatus for heating a chemical used in microelectronic device fabrication according to the present invention.

Referring to FIG. 3, there is illustrated a schematic view showing the construction of an apparatus for heating a chemical used in microelectronic device fabrication according to the present invention. The apparatus includes a chemical supplier 10 and a chemical bath 20. The chemical supplier 10 supplies a chemical prepared for a microelectronic device fabrication process into the chemical bath 20. The chemical bath 20 is filled with the chemical flowing through a pipe 12 from the chemical supplier 10. A first heater 30, for example, an IR lamp, is disposed in the course of the pipe 12 to preheat the chemical in the pipe 12.

In the chemical bath 20, there are disposed a temperature sensor 50, and a second heater 40, such as a coil heater made from chrome, or other equivalent device. The temperature sensor 50 is provided to check the temperature of the chemical which is contained in the chemical bath 20. The second heater 40 is provided to heat the chemical contained in the chemical bath 20.

The first heater 30 and the second heater 40 have a plurality of electrodes 32 and 42, respectively. Electric power is applied to the respective electrodes 32 and 42 at multiple intensities, for example, high, middle and low intensity levels. It is understood, however, that many different intensity levels are contemplated within the practice of the present invention. For example, for extremely precise processes, four, five, six or even more intensity levels may be provided. The intensity levels of the electric power supplied are selectively controlled by a first power controller 60 and a second power controller 70.

The operation of the apparatus of the present invention, constructed as mentioned above, will now be described in detail.

First, when a chemical to be used in a process for fabricating a microelectronic device is supplied from the chemical supplier 10 through the pipe 12 to the chemical bath 20, electric power is supplied to the first heater 30 disposed in the course of the pipe 12, so as to pre-heat the chemical being supplied.

Thereafter, the chemical contained in the chemical bath 20 is heated again by the second heater 40 to a temperature of about 45° C.–200° C., which is suitable for immediate process application. At this time, the second power controller 70 compares the temperature of the chemical sensed by the temperature sensor 50 with a predetermined processing temperature. When the temperature of the chemical in the chemical bath 20 is much less than the predetermined processing temperature, the second power controller 70 supplies a high electric power intensity level through the electrodes 42 to heat the second heater 40. On the contrary, when the temperature of the chemical in the chemical bath 20 gradually approaches the predetermined processing temperature, the second power controller 70 changes the intensity of the electric power supplied to the heater 40 to a middle level intensity, and then to a low level intensity.

Of course, it is to be readily understood that the first power controller 60 operates in the same step-wise power control manner as the second power controller 70. The first power controller 60 controls the pre-heating temperature of the chemical being supplied to the chemical bath 20 by supplying electric power to the first heater 30, selectively, in a step-wise manner at multiple intensities through the respective electrodes 32, according to the temperature of the chemical. For example, a high intensity level may be supplied at the beginning of the process, which is then gradually stepped-down to middle and low intensity levels, depending on the temperature of the chemical.

As mentioned above, when the electric power is supplied selectively in the step-wise manner according to the temperature of the chemical, the electric power is initially applied to rapidly elevate the temperature of the chemical to the predetermined processing temperature. Thereafter, the application of the electric power to the two heaters 30 and 40 is selectively controlled though application of the multiple intensity levels, as well as ON-OFF controlling, to ensure that the temperature of the chemical is maintained within an allowable range. Accordingly, the temperature of the chemical can be precisely controlled with small changes thereto.

Figure 4:
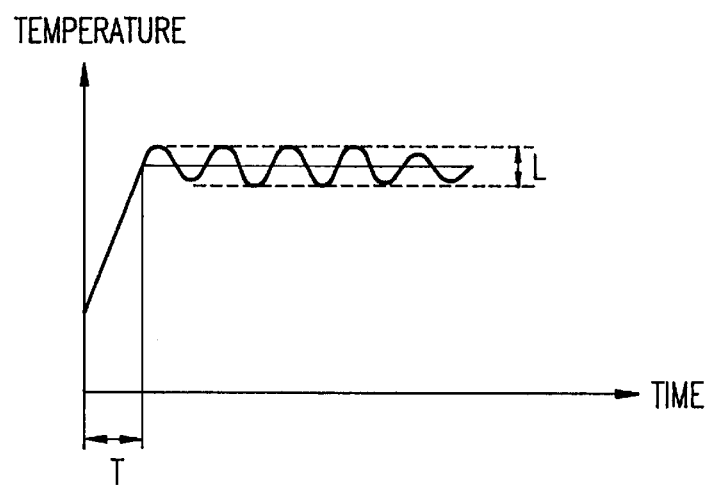
FIG. 4 is a graph showing the relation between time and temperature in heating a chemical by the apparatus shown in FIG. 3.

As a result, by controlling the intensity of the electric power which is applied to the electrodes when heating the chemical, selectively, in a step-wise manner, it reduces the time "T" for the temperature of the chemical to reach the predetermined processing temperature as shown in FIG. 4. Thereafter, even after the temperature of the chemical reaches its predetermined processing temperature, the temperature variation "L" is more easily controlled to reduce the variation "L" around the predetermined processing temperature as shown in FIG. 4.

Therefore, according to the present invention, a chemical supplied to a chemical bath can be rapidly heated in a short time to a temperature suitable for immediate process application to reduce waiting time and thereby improve productivity.

While the present invention has been particularly shown and described with reference to particular embodiments thereof, it will be understood by those skilled in the art that various changes in form and details may be effected therein without departing from the spirit and scope of the invention as defined in the appended claims and their equivalents.

What is claimed is:

1. An apparatus for heating a chemical used in microelectronic device fabrication, said apparatus comprising:

supplying means for supplying a chemical for a microelectronic device fabrication process;

a chemical bath for containing said chemical supplied from said supplying means;

sensing means for sensing a temperature of said chemical contained in said chemical bath;

a first heater for heating said chemical as it is supplied from said supplying means to said chemical bath;

a first electric power source for applying power to said first heater at multiple, selectable intensity levels;

a second heater for heating said chemical contained in said chemical bath;

a second electric power source for applying power to said second heater at multiple, selectable intensity levels; and a first and a second power control means for controlling said first electric power source and said second electric power source, respectively, according to said temperature of said chemical sensed by said sensing means.

2. An apparatus for heating a chemical used in microelectronic device fabrication as claimed in claim 1, wherein each of said first and second heaters comprises a plurality of electrodes for selectively applying electric power of different respective intensity levels through the plurality of electrodes.

3. An apparatus for heating a chemical used in microelectronic device fabrication as claimed in claim 2, wherein said first heater communicates with a supply pipe connecting said supplying means and said chemical bath to preheat said chemical before it is supplied to said chemical bath.

4. A method for heating a chemical used in microelectronic device fabrication, said method comprising the steps of:

(a) setting a predetermined processing temperature required for a microelectronic device fabrication process;

(b) sensing a temperature of said chemical in a chemical bath and comparing said sensed temperature of said chemical to said predetermined processing temperature;

(c) pre-heating said chemical before it is supplied to the chemical bath when said temperature of said chemical is lower than said predetermined processing temperature, by applying a first electric power source to a first heater, which first electric power source has multiple, selectable intensity levels; and (d) heating said chemical inside said chemical bath by applying a second electric power source to a second heater, which second electric power source has multiple, selectable intensity levels, to maintain said temperature of said chemical in the chemical bath within an allowable temperature range.

5. A method as in claim 4, wherein said pre-heating step comprises the sub-step of selectively applying electric power through said first electric power source at one of said multiple intensity levels through a respective plurality of electrodes to the first heater in response to said predetermined processing temperature.

6. A method as in claim 5, wherein an electric power of high intensity is supplied to said first heater in said pre-heating step to rapidly elevate said temperature of said chemical to a temperature suitable for immediate process application.

7. A method as in claim 4, wherein said heating step comprises the sub-step of selectively applying electric power through said second electric power source at one of said multiple intensity levels through a respective plurality of electrodes to the second heater in response to said predetermined processing temperature.

8. A method as in claim 7, wherein an electric power of low intensity is supplied to said second heater in said heating step to maintain the temperature of said chemical in the chemical bath within the allowable temperature range.

* * * * *